April 5, 1927.　　　　O. H. GOETZ　　　　1,623,471
AUTOMOBILE BUMPER
Filed June 24, 1925　　　2 Sheets-Sheet 1
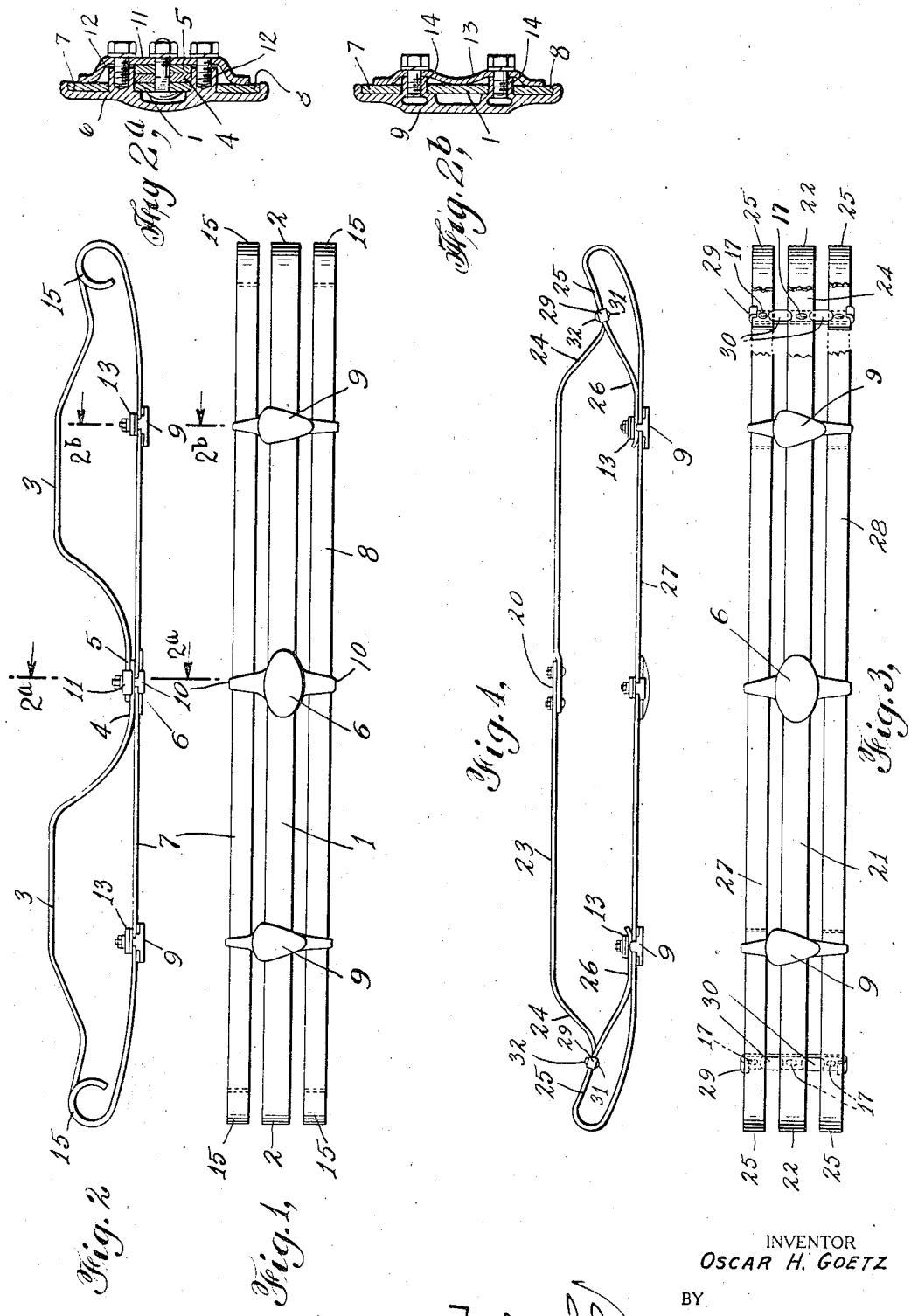
INVENTOR
OSCAR H. GOETZ
BY
ATTORNEY April 5, 1927.  1,623,471
O. H. GOETZ
AUTOMOBILE BUMPER
Filed June 24, 1925   2 Sheets-Sheet 2
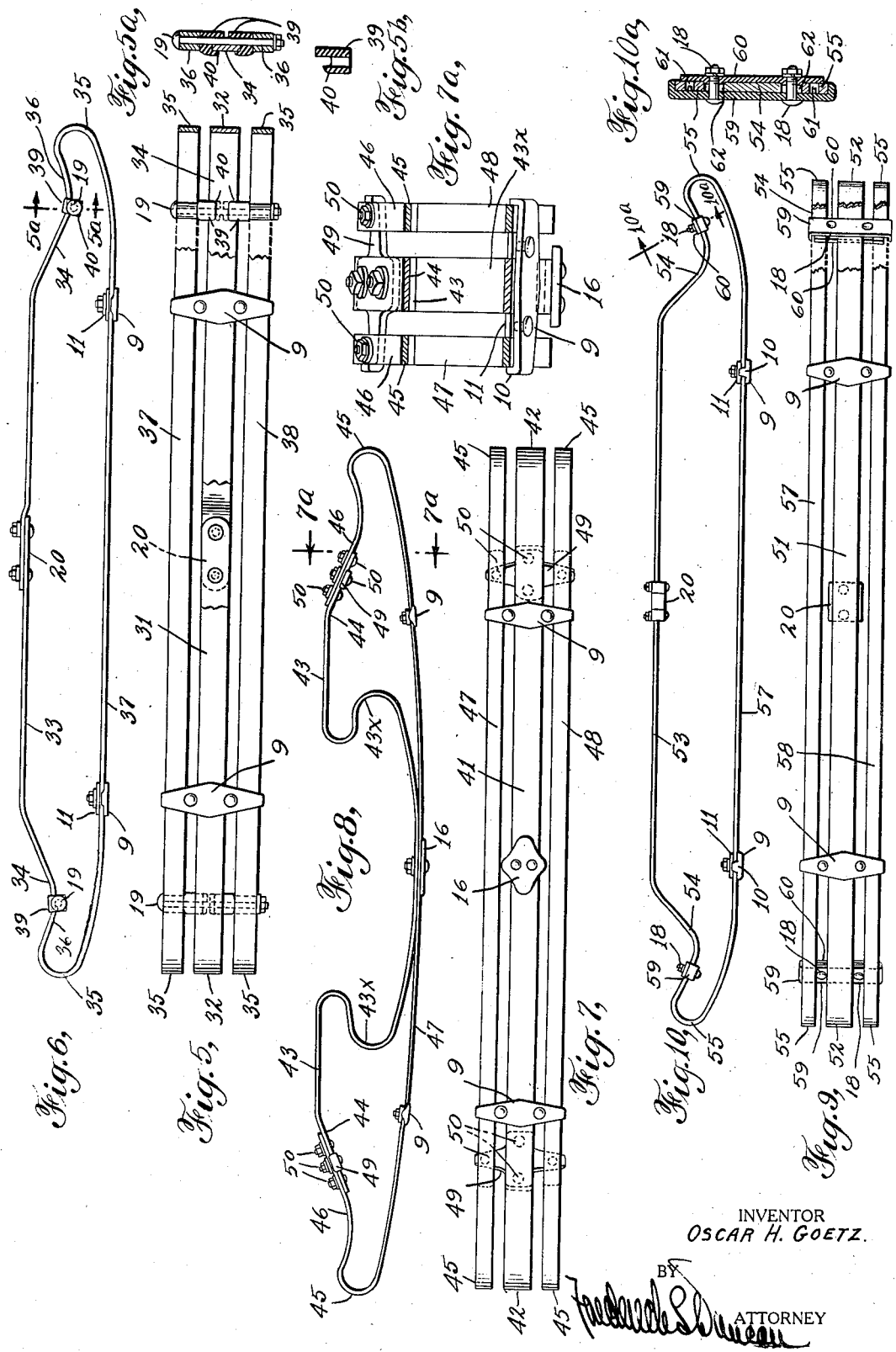
INVENTOR
OSCAR H. GOETZ.
BY
ATTORNEY Patented Apr. 5, 1927.

1,623,471

UNITED STATES PATENT OFFICE.

OSCAR H. GOETZ, OF SPRINGFIELD, MASSACHUSETTS, ASSIGNOR TO AMERICAN CHAIN COMPANY, INC., A CORPORATION OF NEW YORK.

AUTOMOBILE BUMPER.

Application filed June 24, 1925. Serial No. 39,194.

This invention relates to bumpers for automobiles, and has for an object the provision of a multi-bar bumper comprising as a main element a loop end bumper bar constructed entirely in one horizontal plane and having a front impact portion and a rearwardly positioned attaching portion, the bumper comprising also a plurality of auxiliary bars supported by, and in parallelism with, the said front portion of the main bar, serving to widen the impact surface of the bumper.

A further object is to provide a multi-bar bumper, thus constituted of main and auxiliary bars, in which the auxiliary bars have loop ends so conformed in contour with the end loops of the main bar, and so connected therewith, as to afford a high degree of resistance to damage by hooking, and at the same time present a pleasing appearance.

Among other objects of the invention is the provision of a multi-bar bumper in which the means for interconnection of the component bars with each other are so organized as to permit the production of a multi-bar bumper of exceptional strength at an expense very little in excess of the cost of the basic main element, but with all the advantages of certain other bumpers of more elaborate and costly construction of the multi-bar type.

Referring to the drawings:

Fig. 1 is a view in front elevation of a bumper embodying the invention, and Fig. 2 is a plan view thereof.

Fig. 2$^a$ is a sectional view on the line 2$^a$—2$^a$, and

Fig. 2$^b$ is a similar view on the line 2$^b$—2$^b$.

Fig. 3 is a front elevation of a modification, of which Fig. 4 is a plan view.

Fig. 5 is a front elevation of another modification, of which Fig. 6 is a plan view and Fig. 5$^a$ is a section on the line 5$^a$—5$^a$.

Fig. 5$^b$ shows one of the holding collars isolated, in detail, on a somewhat larger scale.

Fig. 7 is a front elevation of still another modification, of which Fig. 8 is a plan view and Fig. 7$^a$ is a section on the line 7$^a$—7$^a$.

Fig. 9 is a front elevation of another modification, of which Fig. 10 is a plan view and Fig. 10$^a$ is a view in vertical section on the line 10$^a$—10$^a$.

In the illustrated embodiment, the reference character 1 designates the front or impact portion of a bumper bar which constitutes the main element of the bumper, having loop ends 2 and a rear portion or portions 3 which may be attached to an automobile by any suitable means, not shown.

In the form illustrated in Figs. 1 and 2 the main bar is formed by bending extensions of the front portion around to form the loop ends 2, then rearward to form the attaching portions 3, and then forward into proximity with the front portion, to which their free ends 4 and 5 are secured in overlapping relation by a suitable clamp 6.

Auxiliary impact members are shown at 7 and 8, one above, and the other below, the main bar 1, extending in parallelism therewith, and supported therefrom in spaced relation by suitable clamps 9, the central clamp 6 being provided with extensions 10 to embrace the auxiliary bars and aid in their support. The preferred structure of the clamp 6 is shown in Fig. 2$^a$ in which 6 designates the face plate of the clamp, and 11 a back plate, one of these plates preferably having spacing projections 12 to enter between the main bar and auxiliary bars.

The preferred structure of each of the auxiliary clamps is shown in detail in Fig. 2$^b$, in which 9 designates the face plate and 13 the rear plate, one of these plates preferably having spacing means 14 to enter between the main and auxiliary bars.

The auxiliary bars 7 and 8 are respectively shown as co-extensive in length with the main bar, terminating in shepherd's crook ends at 15 to avoid hooking and to conform in general curvature with the loop ends 2 of the main bumper bar, thus yielding a pleasing effect at the bumper ends.

In the modification shown in Figs. 3 and 4, the main bar is designated by the reference character 21, and auxiliary impact bars 27 and 28 are supported above and below the main bar by clamps 6 and 9, which may be substantially identical in construction with the similarly numbered clamps already described. In this modification the rear or attaching portion 23 of the main bar is similarly formed by bending extensions of the main bar in the same horizontal plane to form loop ends 22, and the ends of the extensions are bolted together in overlapping relation at 20, forming a substantially straight rear bar at the middle portion, and having near each end a re-entrant curved portion 24 to which are secured end loops formed in extensions 25 of the auxiliary bars respectively, which conform in contour with the end loops 22 of the main bar.

The extremities 26 of the auxiliary bar loops 25 are bent forward into proximity with the impact portions 27 and 28 of the auxiliary bars, being adapted to enter the clamps 9, by which they are secured in place.

Additional clamps 29 are shown connecting the auxiliary bars with the main bar and with each other at the rear extensions of the end loops, these additional clamps being provided with spacer blocks 30 and being preferably riveted to the respective bars, as at 17.

The modified structure thus constituted is exceptionally strong and rigid, pleasing in appearance and adapted to resist hooking damage, and is inexpensive to make and easy to assemble.

In the modification shown in Figs. 5 to 6 the main bar is designated by the reference character 31, and auxiliary impact bars 37 and 38 are supported above and below the main bar by clamps 9 which may be substantially identical in construction with the similarly numbered clamps already described. In this modification the rear or attaching portion 33 of the main bar is similarly formed by bending extensions of the main bar in the same horizontal plane to form loop ends 32 and the ends of the extensions are bolted together in overlapping relation at 20 forming a substantially straight rear bar at the middle portion, and having near each end a re-entrant curved portion 34 to which are secured end loops formed in extensions 35 of the auxiliary bars respectively, which conform in contour with the end loops 32 of the main bar. The extremities 36 of the auxiliary bar loops 35 are formed with eyes through which pass bolts 19, and these bolts are provided with collars 39 having projections 40 which engage with the portions 34 of the main bar and hold the respective loops in assembled relation.

In the modification shown in Figs. 7 to 8, the main bar is designated by the reference character 41, and auxiliary impact bars 47 and 48 are supported above and below the main bar by clamping device 9, which may be substantially identical in construction with the similarly numbered clamps already described. In this modification the loop ends 42 of the main bar are similarly formed by bending extensions of the main bar in the same horizontal plane, and the rear or attaching portion 43 of the main bar is formed by a separate member, lying in the same plane and secured to the ends of the loops 42 in overlapping relation by bolts 50, which also secure thereto a supporting clamp or device 49 bolted at 50 to the loop ends 46 of the auxiliary bars The rear bar member 43 is bent forward in reverse curves 43$^x$ on each side, and is secured to the front bar member 41 by a mid connection 16.

In the modification shown in Figs. 9 to 10, the main bar is designated by the reference character 51, and auxiliary impact bars 57 and 58 are supported above and below the main bar by clamps 9 which may be substantially identical in construction with the similarly numbered clamps already described. In this modification the rear or attaching portion 53 of the main bar is similarly formed by bending extensions of the main bar in the same horizontal plane to form loop ends 52 and the ends of the extensions are secured together by a clamp at 20, forming a substantially straight rear bar at the middle portion, and having near each end a re-entrant curved portion 54 to which are secured end loops formed in extensions 55 of the auxiliary bars respectively, which conform in contour with the end loops 52 of the main bar.

In Fig. 10$^a$ is shown the preferred form of device for securing the end loops 55 to the parts 54 of the end loops of the main bar. These devices comprise members 59 and 60 secured together by bolts 18 and having spacing projections at 62 which enter between the main bar and the auxiliary bars. The ends of the auxiliary bar loops may advantageously be secured to the clamping members 60, as indicated at 61, by stud-and-hole connections which serve to prevent escape of the loop ends from the clamps.

Having described my invention, I claim:

1. An automobile bumper comprising as a main element a bumper bar constructed in a single horizontal plane, having a front impact portion with loop ends and a rear attaching portion formed in continuation of said loop ends; said bumper comprising also an auxiliary impact bar supported in parallelism with the impact portion of said main bar by cross ties extending from said main bar.

2. An automobile bumper comprising as a main element a bumper bar constructed in a single horizontal plane, having a front impact portion with loop ends and a rear attaching portion; said bumper comprising also an auxiliary impact bar co-extensive in length with said main bar and supported in parallelism with the impact portion of said main bar by cross-ties extending from said main bar.

3. An automobile bumper comprising as a main element a bumper bar constructed in a single horizontal plane, having a front impact portion with loop ends and a rear attaching portion; said bumper comprising also auxiliary impact bars supported in the same vertical plane with the impact portion of said main bar, and parallel therewith throughout its length, by cross-ties extending from said main bar.

4. An automobile bumper comprising as a main element a bumper bar constructed in a single horizontal plane, having a front impact portion with loop ends and rear attaching portions formed in continuation of said loop ends; said bumper comprising also auxiliary impact bars supported by said main bar in parallelism with the impact portion thereof, and in the same vertical plane, the front impact portions of the respective bars being substantially co-extensive in length.

5. An automobile bumper comprising as a main element a bumper bar constructed in a single horizontal plane, having a front impact portion with loop ends and a rear attaching portion joining said loop ends; said bumper comprising also auxiliary impact bars supported in parallelism with the impact portion of said main bar by cross-ties connected with, and extending from, said main bar.

6. An automobile bumper comprising as a main element a bumper bar constructed in a single horizontal plane, having a front impact portion with loop ends and a rear attaching portion joining said loop ends; said bumper comprising also auxiliary impact bars supported in parallelism with the impact portion of said main bar by cross-ties connected with, and extending from, said main bar, the impact portion of the respective bars being substantially co-extensive in length and lying in the same vertical plane.

7. An automobile bumper comprising as a main element a bumper bar constructed in a single horizontal plane, having a front impact portion with loop ends and a rear attaching portion; said bumper comprising also auxiliary impact bars supported in parallelism with the impact portion of said main bar by a central cross-tie and spaced auxiliary cross-ties extending above and below said main bar.

8. An automobile bumper comprising as a main element a loop end bumper bar constructed in a single horizontal plane, with a front impact portion and a rear attaching portion; said bumper comprising also auxiliary impact bars supported in parallelism with the impact portion of said main bar by cross-ties extending from said main bar, each such auxiliary bar having curved ends conforming with the loop ends of said main bar.

9. An automobile bumper comprising as a main element a loop end bumper bar constructed in a single horizontal plane, with a front impact portion and a rear attaching portion; said bumper comprising also auxiliary impact bars supported in parallelism with the impact portion of said main bar by clamps extending above and below said main bar, said auxiliary bars having curved ends conforming with the loop ends of said main bar.

10. An automobile bumper comprising as a main element a loop end bumper bar constructed in a single horizontal plane, with a front impact portion and a rear attaching portion; said bumper comprising also auxiliary impact bars supported in parallelism with the impact portion of said main bar by a series of devices extending above and below said main bar, said auxiliary bars having end loops connected with each other and with the end loops of said main bar by certain of said devices.

11. An automobile bumper comprising as a main element a loop end bumper bar constructed in a single horizontal plane, with a front impact portion and a rear attaching portion; said bumper comprising also auxiliary impact bars supported in parallelism with the impact portion of said main bar by a series of clamps extending above and below said main bar, said auxiliary bars having end loops connected with each other and with the end loops of said main bar by certain of said clamps.

12. An automobile bumper comprising as a main element a loop end bumper bar constructed in a single horizontal plane with a front impact portion and a rear attaching portion; said bumper comprising also auxiliary impact bars supported in parallelism with the impact portion of said main bar by a series of devices extending above and below said main bar, said auxiliary bars having end loops connected with each other and with the end loops of said main bar by certain of said devices, and the free ends of said auxiliary end loops being connected with their impact portions by certain others of said devices.

13. An automobile bumper comprising as a main element a loop end bumper bar constructed in a single horizontal plane with a front impact portion and a rear attaching portion, said rear portion having a mid connection with said impact portion, said bumper comprising also auxiliary impact bars supported in parallelism with the impact portion of said main bar by spaced devices extending above and below said main bar.

14. An automobile bumper comprising as a main element a loop end bumper bar constructed in a single horizontal plane with a front impact portion and a rear attaching portion, said rear portion having a mid connection with said impact portion, said bumper comprising also auxiliary impact bars supported in parallelism with the impact portion of said main bar by spaced devices extending above and below said main bar and being secured to said rear portion of said main bar by said mid connection.

In testimony whereof, I have signed this specification.

OSCAR H. GOETZ.